(12) United States Patent
Jangili et al.

(10) Patent No.: US 8,240,427 B2
(45) Date of Patent: Aug. 14, 2012

(54) SOUND ATTENUATION SYSTEMS AND METHODS

(75) Inventors: Ranjit Kumar Jangili, Simpsonville, SC (US); Richard Loud, Ballston Spa, NY (US); Dinesh Venugopal Setty, Karnataka (IN)

(73) Assignee: General Electric Company, Schenectady, NY (US)

( * ) Notice: Subject to any disclaimer, the term of this patent is extended or adjusted under 35 U.S.C. 154(b) by 816 days.

(21) Appl. No.: 12/243,930

(22) Filed: Oct. 1, 2008

(65) Prior Publication Data

US 2010/0077755 A1    Apr. 1, 2010

(51) Int. Cl.
*E04F 17/04* (2006.01)
*F01N 1/24* (2006.01)

(52) U.S. Cl. ........................................ 181/224; 181/222

(58) Field of Classification Search .................. 181/213, 181/214, 217, 218, 222, 224, 225, 252, 256, 181/292

See application file for complete search history.

(56) References Cited

U.S. PATENT DOCUMENTS

| | | | | | |
|---|---|---|---|---|---|
| 2,489,048 | A | * | 11/1949 | Rinehart | 181/224 |
| 2,674,335 | A | * | 4/1954 | Lemmerman | 181/217 |
| 2,959,243 | A | * | 11/1960 | Smith | 181/203 |
| 3,011,584 | A | * | 12/1961 | Lemmerman et al. | 181/217 |
| 3,019,850 | A | * | 2/1962 | March | 181/224 |
| 3,522,863 | A | * | 8/1970 | Ignoffo | 181/252 |
| 3,776,365 | A | * | 12/1973 | Richards | 181/256 |
| 3,854,548 | A | * | 12/1974 | Suzuki | 181/257 |
| 3,894,610 | A | * | 7/1975 | Halter et al. | 181/256 |
| 3,949,830 | A | * | 4/1976 | Muehlbauer et al. | 181/224 |
| 4,127,183 | A | * | 11/1978 | McLarty | 181/224 |
| 4,167,986 | A | * | 9/1979 | Conway | 181/224 |
| 4,180,141 | A | * | 12/1979 | Judd | 181/264 |
| 4,184,565 | A | * | 1/1980 | Price et al. | 181/252 |
| 4,236,597 | A | * | 12/1980 | Kiss et al. | 181/224 |
| 4,336,863 | A | * | 6/1982 | Satomi | 181/224 |
| 4,487,290 | A | * | 12/1984 | Flaherty | 181/256 |
| 4,645,032 | A | * | 2/1987 | Ross et al. | 181/250 |
| 4,842,096 | A | * | 6/1989 | Fujitsubo | 181/252 |
| 5,268,541 | A | * | 12/1993 | Pettersson | 181/224 |
| 5,532,439 | A | * | 7/1996 | Minkin | 181/224 |
| 5,696,361 | A | * | 12/1997 | Chen | 181/224 |
| 5,859,393 | A | * | 1/1999 | Cummins et al. | 181/257 |
| 5,869,792 | A | * | 2/1999 | Allen et al. | 181/224 |
| 6,116,377 | A | * | 9/2000 | Dugan | 181/272 |
| 6,274,216 | B1 | * | 8/2001 | Gonidec et al. | 428/116 |
| 6,536,556 | B2 | * | 3/2003 | Porte et al. | 181/292 |
| 6,550,572 | B2 | * | 4/2003 | Lin | 181/252 |
| 6,802,690 | B2 | * | 10/2004 | Han et al. | 415/119 |
| 2002/0125068 | A1 | * | 9/2002 | Barry et al. | 181/224 |
| 2002/0153197 | A1 | * | 10/2002 | Cummings et al. | 181/249 |
| 2005/0161280 | A1 | * | 7/2005 | Furuya | 181/225 |
| 2008/0065245 | A1 | * | 3/2008 | Tang et al. | 700/94 |

FOREIGN PATENT DOCUMENTS

| | | |
|---|---|---|
| EP | 0219218 | 4/1987 |
| EP | 1063479 | 12/2000 |
| GB | 984817 | 3/1965 |
| WO | WO2007012537 | 2/2007 |

\* cited by examiner

*Primary Examiner* — Jeremy Luks
(74) *Attorney, Agent, or Firm* — Fletcher Yoder, P.C.

(57) ABSTRACT

Methods and devices for increasing the sound attenuation properties of a noise suppression device are provided. In some embodiments, a sound attenuating conduit has an improved shape that provides increased sound attenuation properties. In other embodiments, the sound attenuating conduits are stacked together, and shaped to increase the air flow cross-section. Still other embodiments provide machinery that includes the improved sound attenuating conduits.

32 Claims, 5 Drawing Sheets

SOUND ATTENUATION SYSTEMS AND METHODS

BACKGROUND

The invention relates generally to noise suppression techniques, and more particularly to systems and methods that provide improved sound attenuation properties.

The environmental noise caused by airplanes, automobiles, and other modern machinery can often be an annoyance. To maintain noise below acceptable levels, noise suppression techniques are often employed. Noise suppression has, therefore, become an important technology with a wide variety of industrial and residential applications. Noise suppression devices are often applied in heating ventilation and air conditioning (HVAC) systems, industrial machinery and complexes, transportation vehicles, and any machinery that may tend to produce unacceptably high levels of noise.

Accordingly, various devices and techniques exist for the suppression of noise. For example, to reduce the noise produced by heating and air conditioning systems, noise suppression devices are often fitted within ventilation ducts, ventilation intakes and exhausts, air extracts, etc. In the industrial setting, noise suppression technology is often applied to exhaust ducts, exhaust stacks, and air intake ducts to machinery such as compressors. To further reduce environmental noise, loud machinery is often contained within acoustic enclosures fitted with sound dampening barrier walls. To provide air circulation for acoustic enclosures while still reducing noise, vents are often equipped with acoustic hoods, louvers, silencers or a combination thereof.

The level of sound reduction, or attenuation, provided by such devices is often described in terms of the device's insertion loss. Insertion loss is the reduction in sound amplitude which results from inserting a sound attenuating device in a sound conducting channel, and is often measured in decibels. In a test configuration wherein the sound amplitude is measured at the output of a sound conducting channel, insertion loss may be defined as a ratio of the sound amplitude without the sound attenuating device inserted (A1) to the sound amplitude with the sound attenuating device inserted (A2). This ratio may then be represented according to the following equation:

$$\text{Insertion loss (db)} = 20 \log(A1/A2)$$

Typically, the insertion loss of such devices increases as the length of the device increases. Furthermore, to maintain acceptable air flow, the overall cross sectional area of the device may be enlarged to compensate for the air flow resistance caused by the sound attenuation elements. As a result, noise suppression equipment may tend to be bulky and expensive. Therefore, it may be beneficial to provide a device with improved sound attenuation.

BRIEF DESCRIPTION

Embodiments of the present disclosure provide for methods and devices that increase the sound attenuation properties of certain noise suppression devices. More specifically, the present embodiments include sound attenuating conduits with an improved shape that provides increased sound attenuation properties. In some embodiments, the sound attenuating conduits are stacked together, and shaped to increase the air flow cross-section. Still other embodiments provide noise-producing machinery that includes the improved sound attenuating conduits.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Aspects of the present invention relate to improved noise suppression techniques. Specifically, noise suppression conduits in accordance with certain embodiments are shaped to provide improved sound-reduction characteristics. The improved conduit shape increases the insertion loss of the noise suppression devices made in accordance with the techniques described herein. As a result, noise suppression conduits in accordance with present embodiments may be smaller, lighter, and less expensive compared to other noise suppression conduits that provide comparable levels of insertion loss. Furthermore, in certain embodiments, the shape of the conduit allows for stacked conduit configurations that make efficient use of the available cross-sectional area of the conduit stack and, thus, provide high levels of air flow through the conduit stack.

Figure 1:
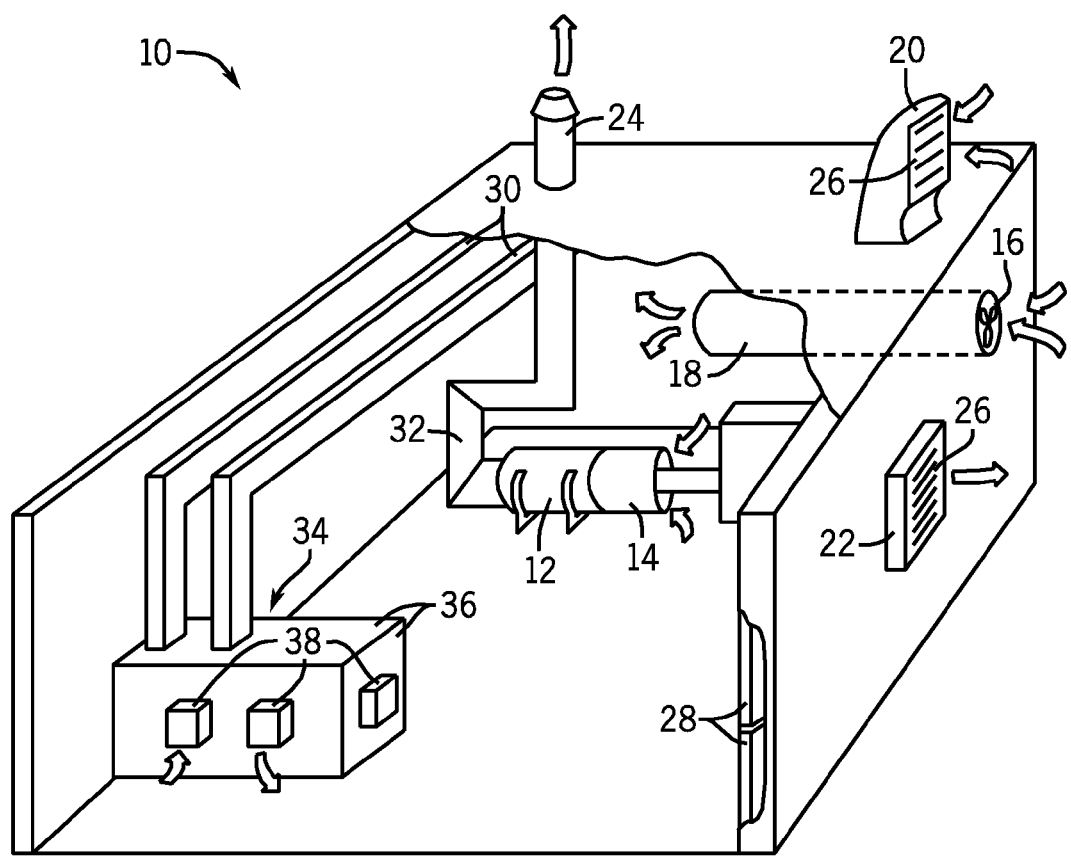
FIG. 1 is an environmental view of an exemplary building showing various noise sources to which sound attenuation equipment may be fitted in accordance with certain embodiments.

Turning now to the figures, FIG. 1 depicts an exemplary building 10 with various sources of noise and various air intake and exhaust points where noise can escape to the outside environment. The building 10 may be an industrial complex or residential building. The building 10 includes one or more noise sources such as the machinery 12, which may include heating systems, air conditioning systems, motors, turbines, compressors, pumps, machine tools, etc. The noise created by these sources may cause annoyance to people inside or around the building 10.

The machinery 12 may include an air in-take 14, which may provide air to a gas compressor of the machinery 12, for example. The building 10 may also include a ventilation system. Accordingly, the building 10 may include ventilation intakes 16 that draw air from the outside and distribute the air through the building 10 through air ducts 18. The building 10 may also include an air extract 20 for providing outside air to machinery within the building 10 such an air conditioning unit, for example. The building 10 may also include a ventilation exhaust 22. In addition, the machinery 12 may produce exhaust fumes that may exit through the exhaust stack 24.

It will be appreciated that the air intake and exhaust points may provide an opportunity for noise produced within the building 10 to escape to the outside environment. To comply with government enacted safety and environmental standards and otherwise reduce noise, various sound attenuation devices in accordance with the disclosed embodiments may be acoustically coupled to the noise sources throughout the building 10. For example, the air extract 20 and the ventilation exhaust 22 may include sound blocking louvers 26. The exterior walls of the building 10 may also be fitted with noise blocking panels 28. Additionally, the air ducts 30 and exhaust duct 32 may be fitted with silencers that absorb sound produced by the machinery 12. Furthermore, loud machinery may be housed within an enclosure 34, which may include barrier walls 36 and may be fitted with noise blocking ventilation hoods 38.

Figure 2:
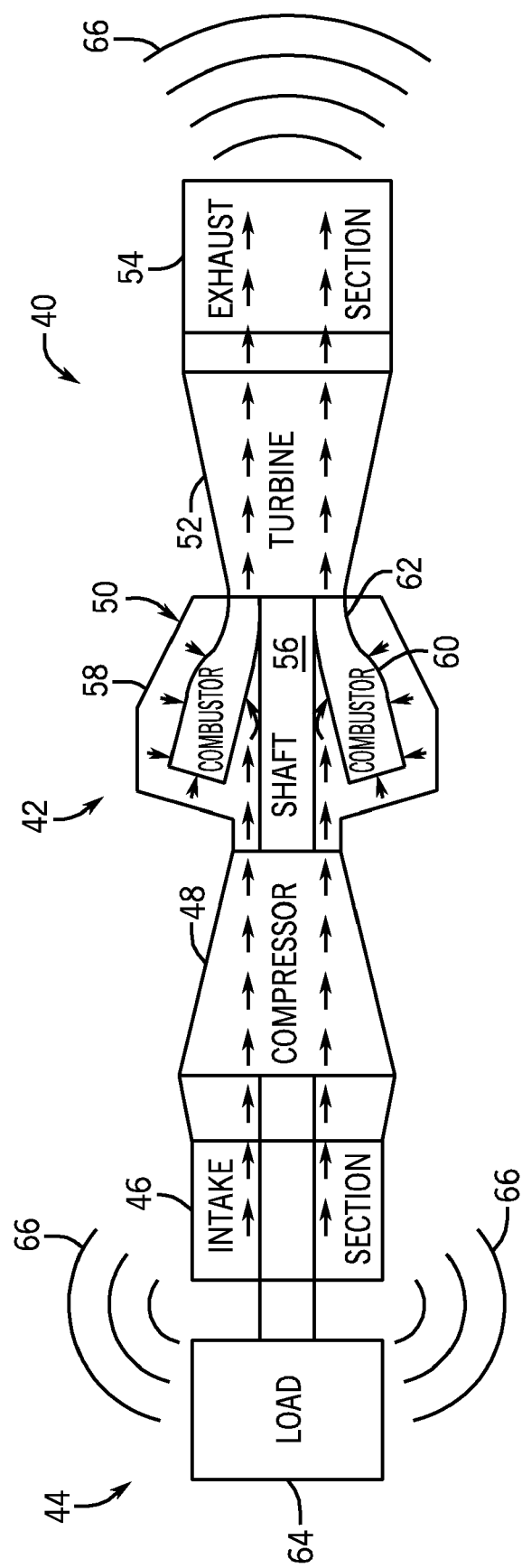
FIG. 2 is a block diagram of an exemplary system having a gas turbine engine to which sound attenuation equipment may be fitted in accordance with certain embodiments.

FIG. 2 is a block diagram of an exemplary system 40 that includes a gas turbine engine 42 acoustically coupled to sound attenuation equipment in accordance with embodiments of the present technique. For example, the system 40 may include an aircraft, a watercraft, a locomotive, a power generation system, or combinations thereof. Accordingly, the load 44 may include a generator, a propeller, a transmission, a drive system, or combinations thereof. The illustrated gas turbine engine 42 includes an air intake section 46, a compressor 48, a combustor section 50, a turbine 52, and an exhaust section 54. The turbine 52 is drivingly coupled to the compressor 48 via a shaft 56.

As indicated by the arrows, air flows through the intake section 46 and into the compressor 48, which compresses the air prior to entry into the combustor section 50. The illustrated combustor section 50 includes a combustor housing 58 disposed concentrically or annularly about the shaft 56 between the compressor 48 and the turbine 52. Inside the combustor housing 58, the combustor section 50 includes a plurality of combustors 60 disposed at multiple radial positions in a circular or annular configuration about the shaft 56. The compressed air from the compressor 48 enters each of the combustors 60, and then mixes and combusts with fuel within the respective combustors 60 to drive the turbine 52. Some or all of the resulting power may be used to drive the shaft 56 into rotation for powering the compressor 48 and/or the load 64. In some embodiments, the exhaust air is used as a source of thrust for a vehicle such as a jet plane.

As depicted in FIG. 2, the system 40 includes two main areas for noise to escape. Specifically, noise originating in the combustor section 50, compressor section 48, turbine section 52 or a combination thereof may tend to escape from the system 40 at the intake section 46 and the exhaust section 54, as illustrated by the sound waves 66. To reduce the noise released by the system 40 to acceptable levels, the system 40 may include sound attenuating devices in accordance with present embodiments, such as silencers, in or along the flow path to/from the intake section 46 and the exhaust section 54.

The sound attenuating devices, which will be described further below, allow the air to pass while reducing the amplitude of the sound.

Figure 3:
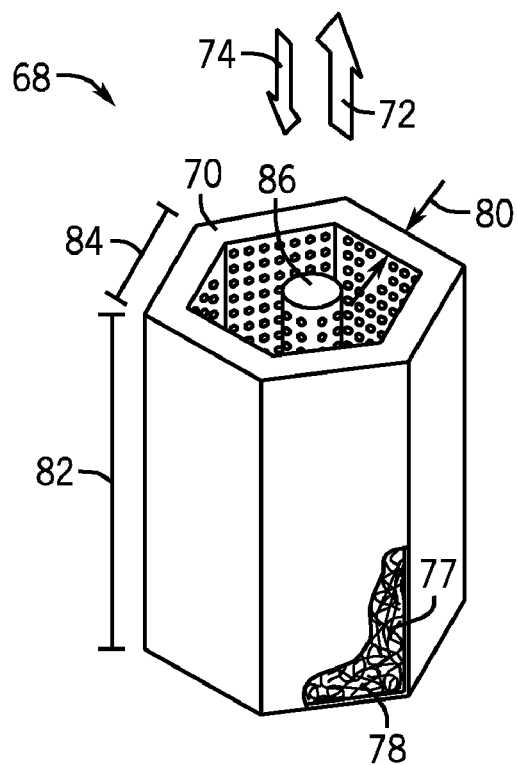
FIG. 3 is a perspective view showing an exemplary sound-attenuating conduit that may be applied to the various noise sources depicted in FIGS. 1 and 2 in accordance with certain embodiments.

FIG. 3 depicts an exemplary sound attenuating conduit 68 that may be employed in the various sound attenuating devices described above in accordance with embodiments. The conduit 68 may be hexagonal and may include side walls 70 that direct a flow of air and attenuate sound waves traveling through the conduit 68. The conduit 68 may be formed from any suitable material, such as plastic or sheet metal, for example. As will be discussed further below, the hexagonal shape of the conduit 68 provides increased sound attenuation compared to square or rectangular conduits of the prior art, while still enabling efficient stacked configurations. Although, for convenience, the present disclosure refers to air conduits, it will be appreciated that the disclosed embodiments may also include conduits that conduct any gas or fluid through which sound may travel.

The conduit 68 may be acoustically coupled to a noise producing device such as the turbine 52 or the compressor 48 as shown in FIG. 2. The conduit 68 may also be acoustically coupled to the machinery 12 or within air ducts 18 and 30, as shown in FIG. 1. In the embodiment shown in FIG. 3, the direction of the air flowing through the conduit 68 is indicated by arrow 74 while the direction of sound traveling through the conduit 68 is indicated by the arrow 72. As indicated by the direction of air and the sound, it will be appreciated that the conduit 68 as depicted in FIG. 3 is an intake conduit. In some embodiments, however, the conduit 68 or an array of conduits 68 may also act as an exhaust, in which case the sound and the air may travel in the same direction. As illustrated, the hexagonal shape of the conduit 68 may be characterized as a hexagonal cross-section, which is generally crosswise (e.g., perpendicular) to the longitudinal axis of the conduit and the fluid flow path (e.g., along arrows 72, 74).

To absorb sound, the side walls 70 of the conduit 68 may be hollow enclosures that form sound attenuating cavities 77. It should be noted that the term "hollow," as used in the present application, is intended to describe the form of the side walls 70 and does not refer to whether the side walls 70 are filled with sound attenuating material. Along the internal surfaces of conduit 68 there may be several openings 76 that enable sound to enter the sound attenuating cavities 77. To increase the level of sound attenuation, the cavities 77 may be filled with sound attenuating material 78, such as mineral wool, fiberglass, foam, or any other material suitable for attenuating sound. Furthermore, in some embodiments, a coaxial baffle 86 may be included to increase the sound attenuation of the conduit 68, as will be described further below.

As the sound travels through the conduit 68, some of the sound enters the sound attenuating cavity 77 through the openings 76 and is attenuated by the sound attenuating material 78, thereby reducing the amplitude of the sound exiting the conduit 68. However, some of the sound hitting the inside surface of the conduit 68 will be reflected rather than being absorbed into the sound attenuating cavity 77. The reflected sound wave may then propagate through the conduit before hitting another inside surface of the conduit 68 where a portion of the sound will again enter the sound absorbing cavity and be attenuated.

Figure 4:
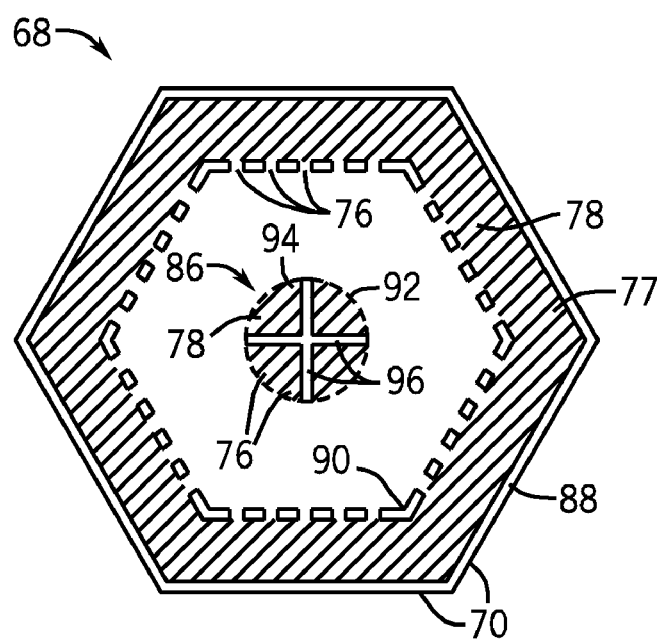
FIG. 4 is a cross sectional view that illustrates the exemplary sound-attenuating conduit shown in FIG. 3 in accordance with certain embodiments.

Turning to FIG. 4, a cross sectional view of the exemplary sound-attenuating conduit 68 shown in FIG. 3 is shown. As shown in FIG. 4, the side walls 70 include an outer wall 88, which forms the exterior of the conduit 68, and an inner wall 90 which forms the inside surface of the conduit 68. Together the outer wall 88 and the inner wall 90 form the sound attenuating cavity 77, which may be filled with sound attenuating material 78, as discussed above. Along the inner wall 90, several openings are disposed that enable sound waves inside the conduit 68 to enter into the sound attenuating cavity 77. The coaxial baffle 86 may be a hollow cylinder 92 that forms a second sound-attenuating cavity 94, which may also be filled with sound attenuating material 78. Additional openings 76 in the cylinder 92 enable sound to enter the second sound attenuating cavity 94. In some embodiments, the coaxial baffle 86 may also include one or more septums 96 that serve to further attenuate and reflect sound waves inside the coaxial baffle 86. Additionally, the coaxial baffle 86 may also be square, hexagonal, or any other shape. In some embodiments, the coaxial baffle 86 may be eliminated.

As depicted in FIGS. 3 and 4, the cross section of the side walls 70 may form an equilateral hexagon so that the conduit 68 will be in the shape of a hexagonal prism. In various embodiments, the side walls may form any polygonal shape with three sides, five sides, six sides, or more than six sides. The polygonal shape also may be selected to enable multiple conduits to fit together in a matrix without any waste of space in between. In other words, the polygonal shape may enable each side of each conduit to mate directly against a wall of an adjacent conduit. Furthermore, the side walls 70 and the coaxial baffle 86 may be rounded or tapered at the ends of the conduit 68 to increase the aerodynamic performance of the conduit.

The dimensions of the conduit 68 may be controlled to balance the sound attenuation and air flow properties of the conduit 68. For example, the noise attenuation of the conduit 68 may be increased by increasing the wall thickness 80, which may increase the size of the sound attenuating cavity and the amount of sound attenuating material 78 included in the side wall 70. Additionally, the length 82 may be increased to improve the sound attenuation properties of the conduit 68. However, increasing the wall thickness 80 and/or the length 82 may also increase the airflow resistance of the conduit 68. Therefore, to maintain or improve air flow, the volumetric flow rate may be increased by increasing the segment length 84 of the conduit 68. Increasing the size of the conduit, however, also increases the weight, space consumption, and cost of the device. Additionally, many applications have a limited amount of space available for noise suppression devices. For these reasons, it is desirable to improve the sound attenuation of the conduit in a smaller space.

Accordingly, embodiments of the present application enable increased sound attenuation for a given size of conduit. The increased sound attenuation may result from the fact that the side walls are at 60 degree angles to each other, so that the sound waves may tend to be reflected from more sound attenuating surfaces in a shorter length of conduit 68. In this way, the sound attenuation of the conduit 68 may be increased compared to other conduits. Because the shape of the conduit 68 provides increased sound attenuation, the desired level of sound attenuation may be obtained with a conduit 68 that has a reduced length 82 or a reduced wall thickness 80, compared to other conduits. Reducing the wall thickness 80 and the length 82 may provide increased airflow through the conduit 68, while also providing the cost savings, space savings, and weight reduction of a smaller device.

Figure 5:
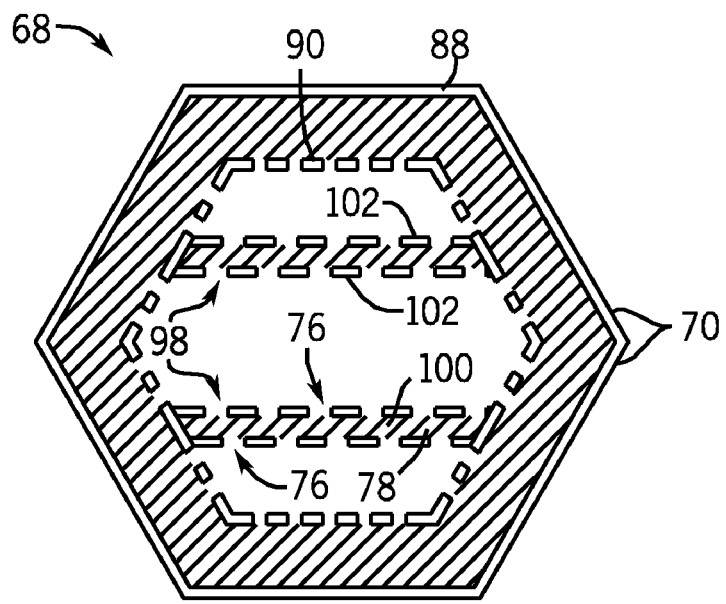
FIG. 5 is a cross sectional view that illustrates another embodiment of a sound-attenuating conduit.

Turning now to FIG. 5, another embodiment of a sound attenuating conduit 68 is shown with different baffles 98 to increase the level of sound attenuation provided by the conduit 68. As shown in FIG. 5, the baffles 98 may be hollow panels that segment the interior cross section of the conduit 68 and define sound attenuating cavities 100. The baffles 98 may be formed by parallel sheets 102 and may be filled with sound attenuating material 78. Furthermore, both sides of the baffles 98 may include openings 76. By including the baffles 98, the amount of sound attenuating surface area within the conduit 68 may increased, thus shortening the length 82 of the conduit 68 that will provide a desired level of sound attenuation. However, placing baffles 98 within the conduit 68 may also tend to increase airflow resistance through the conduit 68, which may be compensated for by increasing the cross-sectional area of the conduit 68. The baffles 98 may or may not extend the full length of the conduit 68.

Figure 6:
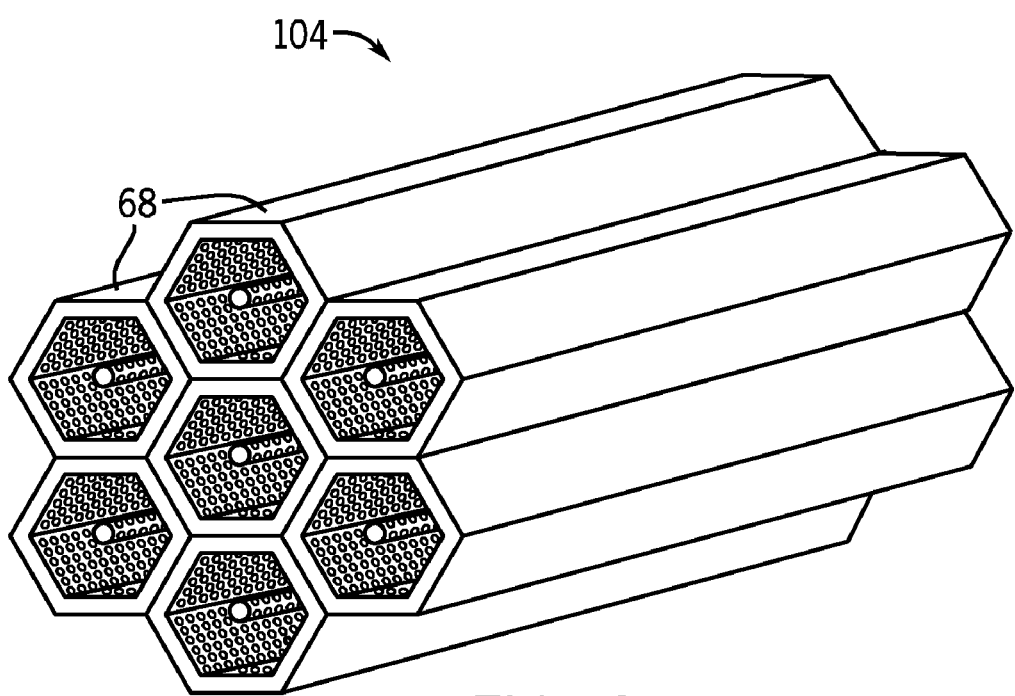
FIG. 6 is a perspective view showing several sound-attenuating conduits stacked together in accordance with certain embodiments.

Turning now to FIG. 6 a perspective view showing several sound-attenuating conduits 68 stacked together is shown in accordance with embodiments. In some cases, various equipment or devices that use noise suppression devices may be packed closely together. For example, a particular gas turbine inlet or exhaust may be as much as thirty feet high and thirty feet across, in some cases. To effectively reduce the noise emitted by such a large opening, hundreds of sound attenuating conduits 68 may be used to cover the entire cross-sectional area of the opening. Therefore, it may be useful to stack the sound attenuating conduits 68, as shown in FIG. 6. In the embodiment shown, seven hexagonal conduits 68 are stacked together to form the conduit stack 104. Because they are hexagonal, the conduits 68 fit together in a honeycomb or matrix configuration and gaps between the outer surface of the conduit are substantially decreased or completely eliminated. In this way, the cross-sectional flow area is increased for a given overall area of the conduit stack 104, while still providing increased sound attenuation compared to other conduits.

Figure 7:
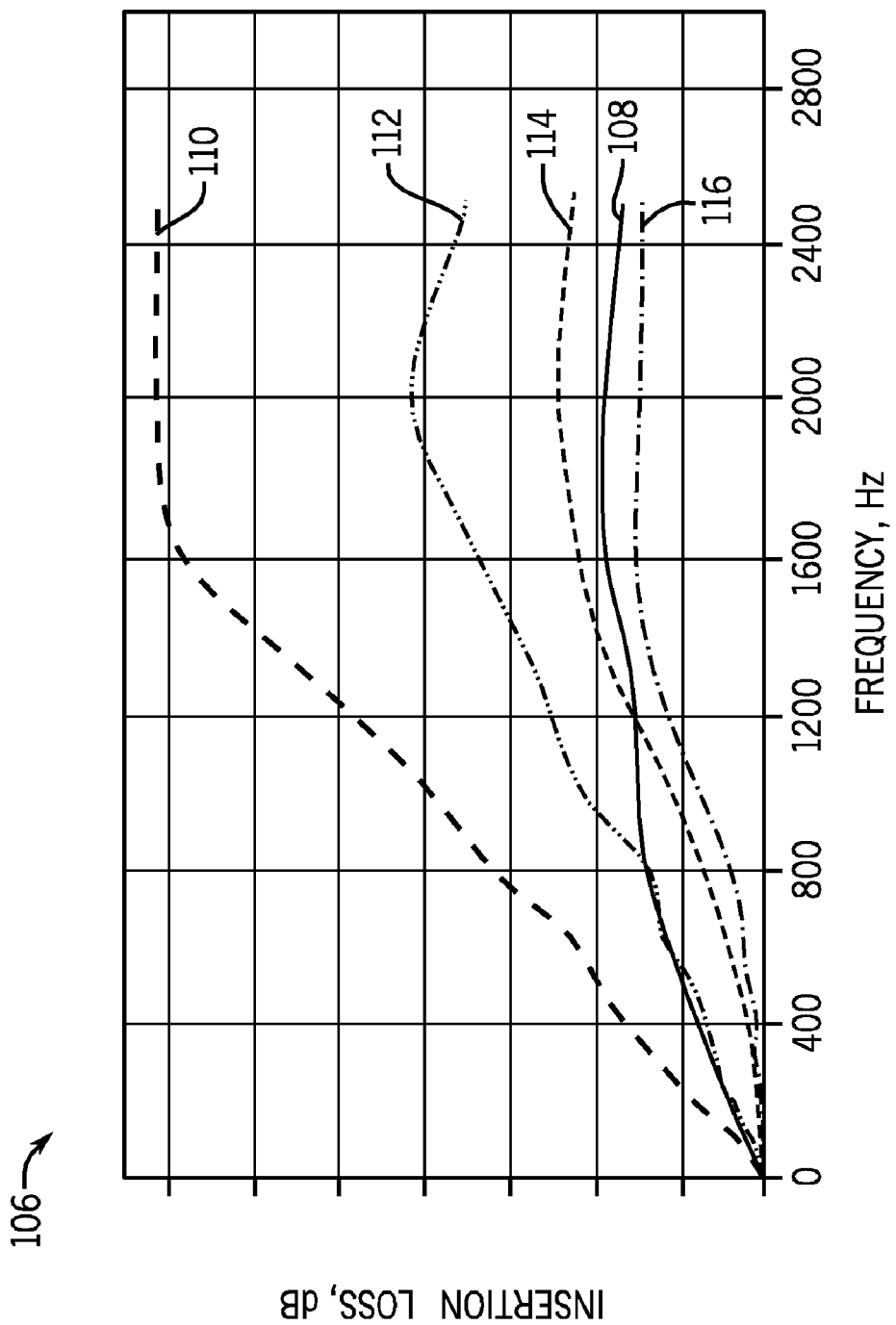
FIG. 7 is a graph illustrating the improved sound attenuation properties of the sound-attenuating conduit shown in FIGS. 3 and 4.

Turning now to FIG. 7, a graph illustrating the improved sound attenuation properties of the sound-attenuating conduit 68 shown in FIGS. 3 and 4 is provided. Graph 106 plots the insertion loss provided by various sound attenuating conduits as a function of frequency. The insertion loss represents the drop in sound amplitude provided by the conduit 68, measured in decibels (dB). Thus, the greater the insertion loss, the greater the effectiveness or performance of the conduit at attenuating sound. It should be noted that graph 106 represents sound attenuation results obtained through computer simulation and calculation. Therefore, actual results may vary.

The solid line 108 represents the insertion loss of a long rectangular conduit with internal baffles. The dashed lines 110, 112, 114 and 116 represent the insertion loss provided by hexagonal conduits 68 with coaxial baffles in accordance with embodiments of the present technique. Specifically, line 110 represents a hex conduit of length equal to the long rectangular conduit 108, and lines 112, 114, and 116 represent hex conduits with lengths that are one-half, three-eighths, and one-quarter of the length of the long rectangular conduit represented by line 108. The long hex conduit and the long rectangular conduit provide approximately equal cross-sectional area and air-flow resistance. However, as can be seen from the graph 106, the long hex conduit provides substantially increased insertion loss at all frequencies compared to the equal-length rectangular conduit with internal baffles, as represented by line 108. In some embodiments, the insertion loss of the hex conduit may be several decibels greater than the equal-length rectangular conduit with internal baffles. The shorter hex conduit represented by line 112, although approximately half the length of the long rectangular conduit, still provides approximately equal insertion loss at low frequencies and substantially increased insertion loss at high frequencies compared to the rectangular conduit. The still shorter hex conduit represented by line 114 provides better insertion loss at high frequencies compared to the rectangular conduit. Finally, the quarter-length hex conduit represented by line 116 provides reduced insertion loss at all frequencies, yet the quarter-length hex conduit is generally comparable to the long rectangular conduit. In other words, at a greatly reduced length compared to the rectangular conduit, the insertion loss provided by the quarter-length hex conduit is still substantial, especially at high frequencies.

As demonstrated by the graph 106, the sound attenuation properties of a noise suppression device may be substantially increased using the embodiments described above. Embodiments of the present techniques may include a wide range of noise inhibiting devices such as silencers, which may be used in duct work, air exchanges, exhaust ducts, air intake ducts, or any other application where noise may escape to an outside environment. Embodiments of the present techniques may also include certain machinery with sound suppression devices included in the air intake and/or exhaust sections of the machinery, such as gas turbine engines, or jet engines. Other applications of the sound attenuating devices described above may occur to those of ordinary skill in the art.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
a sound attenuating conduit comprising hollow sidewalls that define at least one sound attenuating cavity and at least one opening into the at least one sound attenuating cavity, wherein the hollow sidewalls of the sound attenuating conduit define a polygonal cross-section having only three sides or greater than four sides, the sound attenuating conduit comprises a coaxial baffle having a hollow structure that defines at least one sound attenuating cavity and at least one opening into the at least one sound attenuating cavity, and the sound attenuating conduit is configured to be stacked in a honeycomb configuration or matrix of conduits.

2. The system of claim 1, wherein the polygonal cross-section defines an equilateral hexagon.

3. The system of claim 1, wherein the polygonal cross-section defines an equilateral triangle.

4. The system of claim 1, wherein the hollow structure comprises a hollow cylinder.

5. The system of claim 1, wherein the coaxial baffle comprises at least one septum disposed within the at least one sound attenuating cavity and configured to attenuate and reflect sound.

6. The system of claim 5, wherein the at least one septum comprises a cross-shaped cross-section relative to a longitudinal axis of the coaxial baffle.

7. The system of claim 1, wherein the sound attenuating conduit comprises at least one baffle having hollow panels that define at least one sound attenuating cavity and at least one opening into the at least one sound attenuating cavity, and wherein the hollow panels segment the polygonal cross-section of the sound attenuating conduit.

8. The system of claim 1, wherein the ends of the sound attenuating conduit are tapered or rounded to reduce a flow resistance of the sound attenuating conduit.

9. A sound attenuating conduit, comprising:
a fluid path comprising a fluid inlet and a fluid outlet; and
a hollow sidewall comprising a hexagonal inner wall and a hexagonal outer wall extending lengthwise along a longitudinal axis of the fluid path, wherein the inner wall and the outer wall define a sound attenuating cavity, and the inner wall includes openings that acoustically couple the sound attenuating cavity to the fluid path;
wherein the hexagonal outer wall is configured to enable stacking of the sound attenuating conduit in a honeycomb configuration or matrix of conduits, and the sound attenuating conduit is configured to couple to an intake section or an exhaust section of a gas turbine engine to pass an air flow into the gas turbine engine or an exhaust flow out of the gas turbine engine.

10. The sound attenuating conduit of claim 9, wherein the sound attenuating conduit is disposed in the honeycomb configuration or matrix of conduits, each having a respective hollow sidewall with a respective hexagonal outer wall.

11. The sound attenuating conduit of claim 9, wherein the openings define a pattern of perforations along the hexagonal inner wall.

12. The sound attenuating conduit of claim 9, comprising a coaxial baffle disposed coaxially with the hollow sidewall, the coaxial baffle comprising an enclosure defining a second sound attenuating cavity and second openings configured to acoustically couple the second sound attenuating cavity to the fluid path.

13. The sound attenuating conduit of claim 12, wherein the coaxial baffle has a round cross-section relative to the longitudinal axis.

14. The sound attenuating conduit of claim 12, wherein the coaxial baffle has a hexagonal cross-section relative to the longitudinal axis.

15. The sound attenuating conduit of claim 12, wherein the coaxial baffle comprises at least one septum disposed within the second sound attenuating cavity and configured to attenuate and reflect sound.

16. The system of claim 15, wherein the at least one septum comprises a cross-shaped cross-section relative to the longitudinal axis.

17. The sound attenuating conduit of claim 9, comprising at least one baffle comprising hollow panels that define at least one sound attenuating cavity and at least one opening configured to acoustically couple the at least one sound attenuating cavity to the fluid path, the at least one baffle exends lengthwise along the longitudinal axis of the fluid path, and wherein the at least one baffle is attached to the hexagonal inner wall of the sound attenuating conduit.

18. A system comprising:
a sound attenuating conduit configured to attenuate sound along a fluid path, wherein the sound attenuating conduit comprises a hexagonal sidewall that defines a sound attenuating cavity and openings configured to acoustically couple the fluid path to the sound attenuating cavity, the sound attenuating conduit is configured to be stacked in a honeycomb configuration or matrix of conduits, and the sound attenuating conduit comprises a baffle extending lengthwise along a longitudinal axis of the sound attenuating conduit; and
a gas turbine engine having an air intake section or an exhaust section coupled to the sound attenuating conduit having the fluid path, and the fluid path comprises an air intake flow path or an exhaust flow path of the gas turbine engine.

19. The system of claim 18, wherein the baffle defines an additional sound attenuating cavity and additional openings configured to acoustically couple the additional sound attenuating cavity to the fluid path.

20. The system of claim 19, wherein the baffle comprises a septum that separates the additional sound attenuating cavity and attenuates and reflects sound.

21. The system of claim 19, wherein the sound attenuating cavity and the additional sound attenuating cavity are both filled with sound attenuating material.

22. A system, comprising:
a sound attenuating conduit, comprising:
a fluid path having a longitudinal axis;
a hollow wall disposed about the fluid path, wherein the hollow wall has a polygonal cross-section relative to the longitudinal axis, the polygonal cross-section is defined by a polygonal outer wall having at least five or more sides and a polygonal inner wall having at least five or more sides, the hollow wall has a sound attenuating material disposed in a sound attenuating cavity between the polygonal inner and outer walls, and the polygonal inner wall has a plurality of openings from the fluid path into the sound attenuating cavity; and
a baffle disposed lengthwise along a longitudinal axis of the sound attenuating conduit;
wherein the sound attenuating conduit is configured to attenuate sound along the fluid path, wherein the polygonal outer wall is configured to enable stacking of the sound attenuating conduit in a honeycomb configuration or matrix of conduits.

23. The system of claim 22, wherein the inner wall or the polygonal outer wall has at least six or more sides.

24. The system of claim 22, wherein the sound attenuating conduit is configured to couple to an air intake section or an exhaust section of a gas turbine engine, and the fluid flow comprises an air intake flow or an exhaust flow of the gas turbine engine.

25. The system of claim 22, comprising the honeycomb configuration or matrix of conduits, wherein the walls of adjacent conduits are parallel.

26. The system of claim 1, comprising a gas turbine engine having an air intake section and an exhaust section, wherein at least one of the air intake section or the exhaust section comprises the sound attenuating conduit.

27. The system of claim 9, comprising the gas turbine engine having the air intake section and the exhaust section, wherein at least one of the air intake section or the exhaust section comprises the sound attenuating conduit.

28. The system of claim 18, wherein the sound attenuating conduit is disposed in the honeycomb configuration or matrix of conduits.

29. The system of claim 18, wherein the hexagonal sidewall comprises a hexagonal inner wall, or a hexagonal outer wall, or a combination thereof.

30. The system of claim 22, comprising a gas turbine engine having an air intake section and an exhaust section, wherein at least one of the air intake section or the exhaust section comprises the sound attenuating conduit, and the fluid flow comprises an air intake flow or an exhaust flow of the gas turbine engine.

31. The system of claim 22, wherein the polygonal inner wall or the polygonal outer wall is a hexagonal wall.

32. The system of claim 22, wherein baffle comprises an additional sound attenuating material disposed in an additional sound attenuating cavity, a plurality of additional openings from the fluid path into the additional sound attenuating cavity, and the baffle is coaxial with the longitudinal axis.

* * * * *

UNITED STATES PATENT AND TRADEMARK OFFICE
CERTIFICATE OF CORRECTION

| | | |
|---|---|---|
| PATENT NO. | : 8,240,427 B2 | Page 1 of 1 |
| APPLICATION NO. | : 12/243930 | |
| DATED | : August 14, 2012 | |
| INVENTOR(S) | : Jangili et al. | |

It is certified that error appears in the above-identified patent and that said Letters Patent is hereby corrected as shown below:

In Column 8, Line 41, in Claim 17, delete "exends" and insert -- extends --, therefor.

Signed and Sealed this
Thirteenth Day of November, 2012

David J. Kappos
*Director of the United States Patent and Trademark Office*